United States Patent
Richter et al.

(10) Patent No.: US 9,745,423 B2
(45) Date of Patent: Aug. 29, 2017

(54) METHOD FOR PRODUCING THERMOPLASTIC PRE-CERAMIC POLYMERS

(71) Applicant: CLARIANT INTERNATIONAL LTD, Muttenz (CH)

(72) Inventors: Frank Richter, Frankfurt (DE); Matthias Krichel, Offenbach am Main (DE); Daniel Decker, Liederbach a. Ts. (DE); Guenter Motz, Bayreuth (DE); Thomas Schmalz, Kemnath (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/424,024

(22) PCT Filed: Sep. 4, 2013

(86) PCT No.: PCT/EP2013/002645
§ 371 (c)(1),
(2) Date: Feb. 25, 2015

(87) PCT Pub. No.: WO2014/032817
PCT Pub. Date: Mar. 6, 2014

(65) Prior Publication Data
US 2015/0225509 A1 Aug. 13, 2015

(30) Foreign Application Priority Data
Aug. 30, 2012 (EP) ..................................... 12006145

(51) Int. Cl.
*C08G 77/62* (2006.01)
(52) U.S. Cl.
CPC ................... *C08G 77/62* (2013.01)
(58) Field of Classification Search
CPC ................................................... C08G 77/62
See application file for complete search history.

(56) References Cited

U.S. PATENT DOCUMENTS

| | | | |
|---|---|---|---|
| 4,482,669 A * | 11/1984 | Seyferth | C04B 35/571 524/442 |
| 5,010,157 A | 4/1991 | Balasubramanian et al. | |
| 5,198,488 A | 3/1993 | Niebylski | |
| 5,262,553 A | 11/1993 | Bujalski et al. | |
| 6,329,487 B1 | 12/2001 | Abel et al. | |
| 6,479,405 B2 * | 11/2002 | Lee | C08G 77/62 257/E21.243 |
| 2004/0076573 A1 | 4/2004 | Knasiak | |
| 2010/0112749 A1 | 5/2010 | Park et al. | |

FOREIGN PATENT DOCUMENTS

| | | |
|---|---|---|
| CN | 1237563 | 12/1999 |
| EP | 332357 | 9/1989 |
| EP | 412915 | 2/1991 |
| EP | 1232162 | 8/2002 |
| WO | WO 87/05298 | 9/1987 |
| WO | WO 94/26806 | 11/1994 |

OTHER PUBLICATIONS

Kruger (Journal of Polymer Science: Part A, vol. 2, (1964) 3179-3189).*
PCT International Search Report for PCT/EP2013/002645, mailed Oct. 9, 2013.
International Preliminary Report on Patentability for PCT/EP2013/002645, mailed Mar. 3, 2015.
Ralf Riedel, et al., "High-tech Materials Synthesis Methods for Ceramic Materials", Chem. Unserer Zeit, 44, pp. 208-227 (2010).
Christoph Konetschny, et al., "Dense Silicon Carbonitride Ceramics by Pyrolysis of Cross-linked and Warm Pressed Polysilazane Powders", Journal of the European Ceramic Society, 19, pp. 2789-2796 (1999).
Sylvia Kokott and Gunter Motz, "Cross-Linking Via Electron Bean Treatment of a Tailored Polysilazane (ABSE) for Processing of Ceramic SiCN-Fibers" Soft Materials, 4 (2-4), pp. 165-174 (2007).
Carl R. Kruger and Eugene G. Rochow, "Polyorganosilazanes", Journal of Polymer Science: Part A, vol. 2 pp. 3179-3189 (1964).
R.J.P. Corriu, et al., "Silicon-nitrogen Bond Formation by Nucleophilic Activation of Silicon-hydrogen Bonds", Journal of Organometallic Chemistry, 406, pp. C1-C4 (1991).
English abstract for EP 412915, dated Feb. 13, 1991.
Declaration of Dr. Daniel Decker, dated Nov. 30, 2015.
Octavio Flores, et al., "Selective Cross-linking of Oligosilazanes to Tailored Meltable Polysilazanes for the Processing of Ceramic SiCN Fibres", Journal of Materials Chemistry A, pp. 15406-15415 (2013).
Octavio Flores, et al., "Ceramic Fibers Based on SiC and SiCN Systems: Current Research, Development, and Commercial Status", Advanced Engineering Materials, pp. 1-16 (2014).
Excerpt of Gary J. Knasiak's Internal Presentation at Clariant entitled "Polysilazane Chemistry", Jun. 2006.
English abstract for CN 1237563, dated Dec. 8, 1999.

* cited by examiner

*Primary Examiner* — Kuo-Liang Peng
(74) *Attorney, Agent, or Firm* — Anthony A. Bisulca

(57) ABSTRACT

A method for producing high-molecular weight, solid, meltable, thermoplastic, pre-ceramic polymers by converting liquid low-molecular weight polysilazanes in a solvent, in the presence of a catalyst, and a stopping reagent stopping the reaction as soon as the desired degree of polymerization is achieved. The obtained polysilazanes can be processed by conventional industrial methods, such as, for example, extrusion, injection molding, melt spinning, calendering, film and hollow body blowing, rotational molding, fluidized bed sintering, flame spraying and transfer molding (RTM and DP RTM).

9 Claims, No Drawings

METHOD FOR PRODUCING THERMOPLASTIC PRE-CERAMIC POLYMERS

The field of ceramic materials can in principle be subdivided into the silicates, used for utility and sanitary ceramics, and the high-performance ceramics, used for engineering ceramics (Ralf Riedel, Aleksander Gurlo, Emanuel Ionescu, "Chem. Unserer Zeit", 2010, 44, 208-227). High-performance ceramics include ceramics formed on the basis of oxidic materials (e.g., $Al_2O_3$) and nonoxidic materials.

These include, for example, ceramics based on silicon nitride ($Si_3N_4$) and silicon carbonitride (SiCN), which have exceptional thermomechanical properties. For instance, depending on the stoichiometry of their composition, silicon carbonitrides in an inert atmosphere are found to have no tendency to crystallize at up to about 1350° C. (Christoph Konetschny, Dusan Galusek, Stefan Reschke, Claudia Fasel, Ralf Riedel, "Journal of the European Ceramic Society", 19, 1999, pages 2789-2769). In air, their stability extends to 1500° C.

High-performance ceramics such as, for example, $Si_3N_4$ and SIGN ceramics are by reason of their properties increasingly used in the sectors of high-temperature applications (energy technology, automotive construction, aerospace, etc.), biomedical engineering, materials processing, chemical engineering or alternatively as a functional material in microelectronics.

The manufacture of ceramic components generally involves some form of powder-technological processing. This means that the starting material in powder form is put into a shape which is subsequently densified without the occurrence of melting (i.e., is sintered).

This procedure is the only one which can be used for purely metal oxide- and nitride-based ceramics, since the melting point of these ceramic materials is too high for any processing or the material decomposes beforehand. Processing by classic, industrially common, shape-conferring technologies, for example injection molding or conventional casting methods involving the use of liquid or molten materials would be desirable, since this would greatly shorten cycle time, reduce the consumption of material and additionally also reduce energy requirements.

To produce nonoxidic ceramic materials in the silicon-carbon-nitrogen (SiCN) system, by contrast, pre-ceramic, silicon-based polymers are known. In order that these pre-ceramic polymers be used in industrial, continuous processes, their properties have to be reproducible and have long-term stability.

Commercial availability of appropriate starting materials is presupposed. At the same time, resource-sparing and hence inexpensive conversion is pivotal for wide industrial use.

The sole pre-ceramic polymers for the production of SiCN ceramics that meet the requirements of commercial availability on the ton scale at acceptable prices are the organopolysilazanes (OPSZs), hereinafter referred to as polysilazanes. Polysilazanes (e.g., KiON ML 33 and KiON HTT 1800) are currently obtainable from AZ Electronic Materials and Clariant. Production is as described in EP 1232162 B1 via the liquid ammonia method.

Polysilazanes obtained as described in EP 1232162 B1 are liquid and low in viscosity (<50 mPa*s) and relatively low in molecular weight (<2500 g/mol). Liquid polysilazanes have the decisive in-principle disadvantage that they cannot be used with certain processing techniques already mentioned above. The classic processing techniques of the polymer industry (extrusion, for example) are likewise not possible. A further disadvantage of liquid polysilazanes of the type described by EP 1232162 B1 resides in their comparatively low molecular weight. This disadvantage is ultimately responsible for a low ceramic yield. It is accordingly desirable to produce higher molecular weight, solid and meltable polysilazanes therefrom.

There is thus an urgent need for a procedure which converts the low-viscosity liquid polysilazanes described above into higher molecular weight solid and meltable polysilazanes. This procedure should deliver reproducible polymers that are thermally stable, meltable and soluble as well as having a high molecular weight. They are storage stable for 12 months at least and can be processed using industrial procedures. Examples are: extrusion, injection molding, melt spinning, calendering, film blowing, blow molding, rotational molding, fluidized bed sintering, flame spraying and transfer molding (RTM and/or DP-RTM).

The literature documents a very wide variety of procedures for converting liquid silazane-based pre-ceramic polymers into solid precursors.

The use of solid basic catalysts plays a big part here. EP 332357 A1 describes the use of alkoxides to increase the molecular weight of the liquid starting materials and obtain solid products.

True, the products obtained thereby have a higher ceramic yield than the starting materials, but the reproducibility of the procedure is limited, the products are highly crosslinked and hence often insoluble and unmeltable; any further processing is thus only possible with great difficulty, if at all.

The use of Lewis-acidic substances is similarly known. However, this is not suitable for the raw materials which are commercially available, since it leads to unmeltable products.

A further procedure for increasing the molecular weight consists in the agency of transition metal complexes, specifically the use of ruthenium carbonyls as described by Y. Blum or by Z. Xie, X. Hu, Z. Fan, W. Peng, X. Li, W. Gao, X. Deng, Q. Wang. Again, a highly crosslinked polymer is obtained and the ceramic yield which is high, but cannot be further processed, since the product is insoluble and unmeltable. Application to commercially available polysilazanes was unsuccessful, no change in the molecular weight or the physical state being observed.

Gaseous substances have similarly been used for increasing the molecular weight of polysilazanes. Examples are $BH_3$ (U.S. Pat. No. 5,262,553 A), gas mixtures consisting of $NH_3$—$H_2O$ (EP 412915 A1), HCl and HBr mixtures or alternatively ozone.

To prepare the ABSE (ammonolyzed bissilylethane) precursor polycarbosilazane, a reaction combination of hydrosilylation, ammonolysis and subsequent thermal aftertreatment has been described (S. Kokott, G. Motz, "Soft Materials" (2007), Volume Date 2006, 4 (2-4), 165-174). The ABSE precursor is commercially unavailable and the thermal aftertreatment is incapable of establishing reproducible properties.

The use of ammonium salts was described very early by Müller and Rochow (Carl R. Krüger, Eugene G. Rochow, "Journal of Polymer Science", Part A, Vol. 2 (1964), page 3179). Liquid polysilazanes are vigorously heated in the presence of $NH_4Cl$, $NH_4Br$ or $NH_4I$ to obtain waxy products. Corriu (R. J. P. Corriu, D. Leckercq, P. H. Mutin, J. M. Planeix, A. Vioux, "Journal of Organometallic Chemistry", 406, 1991, S. C1)

uses Bu₄NF and reports an increased molecular weight. In these cases, ultimately insoluble and unmeltable products (thermosets) are obtained. Further processing is not achieved.

In summary, none of the methods described meet the need for a reproducible procedure which solid high molecular weight polymers that are soluble and meltable, and/or are unsuitable for an industrial method employing commercially available raw materials.

It has now been found that, surprisingly, the combination of a specific reaction medium, of a defined amount of a catalyst, of the precisely timed use of a stopping reagent, of concentrations established for the starting materials in a defined manner, and of the reaction temperature ensures the reproducible conversion of liquid commercially available polysilazanes into solid, meltable and soluble products. The method is notable in that the properties of the polymer (molecular weight, softening range) of the solid products are precisely establishable by varying the reaction conditions.

The invention accordingly provides a method for producing high molecular weight solid meltable thermoplastic pre-ceramic polymers by reaction of liquid low molecular weight polysilazanes in a solvent, in the presence of a catalyst by stopping the reaction with a stopping reagent as soon as the desired degree of polymerization is attained.

The liquid low molecular weight polysilazanes employed are preferably polysilazanes or a mixture of polysilazanes of formula (1)

   (1)

where R', R" and R'" are the same or different and each independently represent hydrogen or an optionally substituted alkyl, aryl, vinyl or (trialkoxysilyl)alkyl radical, where n represents an integer such that the polysilazane has a number-average molecular weight of 150 to 150 000 g/mol.

Of particular suitability here are polysilazanes wherein R', R" and R'" each independently represent a radical selected from the group consisting of hydrogen, methyl, ethyl, propyl, isopropyl, butyl, isobutyl, tert-butyl, phenyl, tolyl, vinyl, 3-(triethoxysilyl)propyl and 3-(trimethoxysilylpropyl).

One preferred embodiment utilizes perhydropolysilazanes of formula (2)

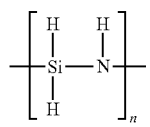   (2)

where n represents an integer such that the polysilazane has a number-average molecular weight of 150 to 150 000 g/mol.

The starting reagents used in a further preferred embodiment are polysilazanes of formula (3)

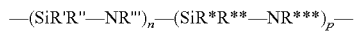   (3)

where R', R", R'", R*, R and R* each independently represent hydrogen or an optionally substituted alkyl, aryl, vinyl or (trialkoxysilyl)alkyl radical and n and p are such that the polysilazane has a number-average molecular weight of 150 to 150 000 g/mol.

Particular preference is given to compounds where
R', R'" and R*** represent hydrogen and R", R* and R** represent methyl;

R', R'" and R*** represent hydrogen and R", R* represent methyl and R** represents vinyl;

R', R'", R* and R* represent hydrogen and R" and R represent methyl.

This may be illustrated by way of example for the KiON ML33 and HTT 1800 raw materials used:
KiON ML 33: R'=H, R"=methyl, R'"=H
R*=R=methyl, R*=H
n=0.67
p=0.33

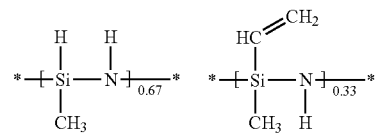

KiON HTT 1800: R'=H, R"=methyl, R'"=H
R*=methyl, R=vinyl, R*=H
n=0.8
p=0.2

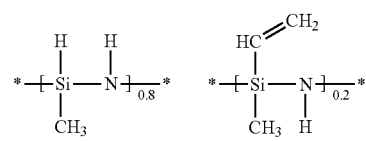

Preference is likewise given to employing polysilazanes of formula (4)

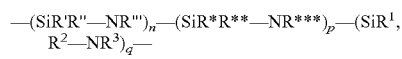   (4)

where R', R", R'", R*, R, R*, R¹, R² and R³ each independently represent hydrogen or an optionally substituted alkyl, aryl, vinyl or (trialkoxysilyl)alkyl radical and n, p and q are such that the polysilazane has a number-average molecular weight of 150 to 150 000 g/mol.

Particular preference is given to compounds where R', R'" and R*** represent hydrogen and R", R*, R** and R² represent methyl, R³ represents (triethoxysilyl)propyl and R¹ represents alkyl or hydrogen.

The concentration in the reaction medium of the polysilazane raw materials used is chosen so as to ensure adequate comixing. The concentration range to be chosen here extends from 20 to 80 wt %. Particular preference is given to the range from 30 to 70 wt % and very particular preference to the range of 33-66 wt %.

The reaction medium suitably comprises particularly organic solvents containing no water nor reactive groups (such as hydroxyl or amine groups). Examples include aliphatic or aromatic hydrocarbons, (hydro)halocarbons, esters such as ethyl acetate or butyl acetate, ketones such as acetone or methyl ethyl ketone, ethers such as tetrahydrofuran or dibutyl ether, and also mono- and polyalkylene glycol dialkyl ethers (glymes) or mixtures thereof.

The reaction medium employed comprises especially aprotic solvents, for example diethyl ether, cyclohexane, HMPTA, THF, toluene, chlorinated hydrocarbons, pentane, hexane and dibutyl ether. Particular preference is given to THF, toluene, chlorinated hydrocarbons, diethyl ether and dibutyl ether.

The method can be carried out in the temperature range from −20° C. to 110° C., preference is given to the range between 0 and 80° C., while the temperature range between 15 and 50° C. is very particularly preferable.

The method can be carried out in the pressure range from 300 mbar to 30 bar, preference is given to the range between 500 mbar and 5 bar, while the pressure range between 750 mbar and 3 bar is very particularly preferable.

The catalyst used comprises chlorides, bromides, iodides, fluorides and hydroxides of tetraalkyl-substituted ammonium salts. Examples are: tetramethyl-ammonium chloride, tetramethylammonium bromide, tetramethylammonium iodide, tetramethylammonium fluoride, tetraethylammonium chloride, tetraethylammonium bromide, tetraethylammonium iodide, tetraethylammonium fluoride, tetrabutylammonium chloride, tetrabutylammonium bromide, tetrabutylammonium iodide, tetrabutylammonium fluoride but also Schwesinger's catalyst and phase transfer cats (PiP). Particular preference is given to tetrabutylammonium salts and Schwesinger's reagent.

The concentration of the catalyst should preferably be chosen in the range from 0.01 wt % to 10 wt %. Particular preference is given to concentrations between 0.1 wt % and 5 wt %. The range between 0.15 wt % and 2 wt % is very particularly preferable.

The reaction gives rise to gaseous products (hydrogen, ammonia, silanes). Precise timing is accordingly advantageous for admixing the catalyst. An admixture within 10 to 200 min is accordingly preferable, while the range between 20 and 100 is very particularly so.

The method is advantageously carried out under a protective gas, since the silazanes used are oxidation and hydrolysis susceptible.

Useful stopping reagents include for example: hydrides of the alkali and alkaline earth metals, in particular KH, NaH, LiH, $CaH_2$, $LiAlH_4$, $Ca(BH_4)_2$ and $NaBH_4$. Particular preference is given to NaH, $LiAlH_4$, $NaBH_4$ and $Ca(BH)_4$.

The stopping reagent has to be added at the right time and in dissolved form. Useful solvents for the stopping reagent include in particular the materials mentioned for use as reaction medium. The concentration of stopping reagent in the solutions should be between 2 and 70%, preferably between 3 and 30% and most preferably between 5 and 10%. The time for admixing the stopping reagent can be determined by tracking the evolved hydrogen gas. The preferred time for admixing the stopping reagent is reached when the hydrogen flow is down to $\frac{1}{10}$ of its maximum value.

The product may be isolated, for example, by crystallization at low temperatures and subsequent filtration or by concentrating the reaction mixture.

The end products are characterized by determining their molecular weight distribution by GPC and also their softening ranges. Rheological studies provide information as to the degree of the crosslinking.

The products formed are solid polysilazanes having a molecular weight of at least 2000 g/mol to 2 million g/mol, in particular of 10 000 g/mol to 1 million g/mol. The degree of crosslinking and hence the softening range can be established anywhere between −15° C. and 180° C. via the choice of reaction conditions. The products obtained have a shelf life of not less than 12 months, if properly stored, and can at any time be dissolved in commonly used polar and apolar aprotic solvents. Insufficient monitoring of reaction conditions results in insoluble, unmeltable materials being obtained.

Preferred solvents for dissolution include, for example, ethers (THF) and apolar hydrocarbons (hexane, petroleum ether).

These polysilazanes obtained with the method of the present invention are obtainable in a reproducible manner, thermally stable, meltable and soluble and have a high molecular weight. They are further notable for being stable in storage for not less than 12 months and being processable using the conventional industrial procedures, for example extrusion, injection molding, melt spinning, calendering, film blowing, blow molding, rotational molding, fluidized bed sintering, flame spraying and transfer molding (RTM and/or DP-RTM).

EXAMPLES

Inventive Example 1

3.0 kg of KiON ML 33 and 1.5 kg of THF are admixed at room temperature, over 40 min, with a solution of 27.1 g of tetrabutylammonium fluoride (TBAF) dissolved with 513 g of THF. On completion of the admixture, the mixture is stirred for a further 30 min and then admixed with 7.5 g of $Ca(BH_4)_2$ suspended in 133.5 g of THF. The mixture is stirred for a further 35 min. The THF is finally removed under elevated temperature and reduced pressure to leave 2.76 kg of a solid polysilazane having a softening point ~90° C. and an $M_w$ of 38 000 g/mol.

Inventive Example 2

100 g of KiON ML 33 and 0.2 kg of THF are admixed at room temperature, over 40 min, with a solution of 0.26 g of TBAF dissolved with 20 g of THF. On completion of the admixture, the mixture is stirred for a further 90 min and then admixed with 0.25 g of $Ca(BH_4)_2$ suspended in 5 ml of THF. The mixture is stirred for a further 30 min. The THF is finally removed under elevated temperature and reduced pressure to leave 87.9 g of a solid polysilazane having a softening point ~50° C. and an $M_w$ of 4190 g/mol.

Inventive Example 3

An argon-inertized 2 l four-neck flask equipped with stirrer, thermometer and condenser is initially charged with 0.075 kg of THF and 150 g of devolatilized KiON HTT 1800. A solution of 0.375 mg of TBAF dissolved in 27.16 ml of THF is added in the course of 30 min. After 30 min of subsequent stirring, the reaction solution is admixed with 375 mg of $Ca(BH_4)_2$ in 7.5 ml of THF to stop the reaction. The solvent is removed to leave a white solid which solidifies at about 110° C. and has an $M_w$ of 116 000 g/mol.

Inventive Example 4

A nitrogen-inertized 1 L single-neck flask equipped with magnetic core and condenser is initially charged at RT with 200 g of THF, 100 g of KiON HTT 1800 and 100 g of KiON ML 33. The homogeneous mixture is admixed with a solution comprising 500 mg of TBAF in 38.2 ml of THF in the course of 60 min. After 30 min of subsequent stirring, the reaction is stopped with 491 mg of $Ca(BH_4)_2$ in 10 ml of THF. Distillation leaves a solid having a softening point of about 60° C. and an $M_w$ molecular weight of 10 100 g/mol.

Inventive Example 5

An argon-inertized 1 l single-neck flask equipped with magnetic core and condenser is initially charged at RT with 200 g of diethyl ether and 100 g of Ceraset PSZ 20, and the initial charge is thoroughly comixed. A mixture of 1 ml of 1M TBAF/THF solution and 19 ml of diethyl ether are admixed in the course of 5 min. Following 30 min of further reaction, admixtures of 0.25 g of Ca(BH$_4$)$_2$ in diethyl ether and a further 30 min of stirring, the solvent is removed to leave a melt which is highly viscous at 115° C. and solidifies vitreously on cooling. M$_w$=21 300 g/mol.

Inventive Example 6

An inertized 500 ml flask is charged with 80 g of toluene and 40 g of Ceraset PSZ 20. A solution of 0.4 ml of 1M tetrabutylammonium hydroxide and 7.6 ml of toluene is admixed in the course of 10 min followed by stirring for 25 min. The admixture of 2 ml of toluene with 0.1 g of Ca(BH$_4$)$_2$ suspended therein stops the reaction completely. The solvent is removed to leave a substance which is a waxy solid at room temperature and has an M$_w$ of 20 900 g/mol.

Inventive Example 7

300 g of THF are mixed with 600 g of KiON ML 33 in a 4 l flask. 6 ml of a 1M TBAF solution diluted with 114 ml of THF are added over 30 min followed by 30 min of subsequent stirring. The reaction is stopped with 14 mmol of LiBH$_4$ in 7 ml of THF. Following filtration and removal of the solvent, a vitreously solidified melt was obtained. The M$_w$ is 17 350 g/mol.

Inventive Example 8

0.22 ml of a 0.3M solution of tetrakis[tris(dimethylamino) phosphoranylideneamino]-phosphonium fluoride in benzene are initially charged in 40 ml of THF and admixed with 10 g of KiON HTT 1800 in the course of 10 min. The reaction is stopped with Ca(BH$_4$)$_2$ and the solvent is removed to obtain a solid whose M$_w$ is 6200 g/mol.

Inventive Example 9

300 g of THF are mixed with 600 g of KiON ML 33 in a 4 l flask. 6 ml of a 1M TBAF solution diluted with 114 ml of THF are added over 30 min followed by 30 min of subsequent stirring. The reaction is stopped with 14 mmol of NaH in 7 ml of THF. Following filtration and removal of the solvent, a vitreously solidified melt was obtained. The M$_w$ is 28 840 g/mol.

Inventive Example 10

90 g of KiON HTT 1800 and 210 g of THF are initially charged and cooled down to 0° C. Under vigorous agitation, 15 ml of THF with 450 mg of TBAF dissolved therein are added in the course of 60 min. The mixture is subsequently stirred 60 min at 0° C. and warmed to 20° C. before the reaction is stopped with 300 mg of Ca(BH$_4$)$_2$ in 50 ml of THF. The THF is removed by distillation to leave a waxy solid having an M$_w$ of 1650 g/mol.

Comparative Example 1

300 g of THF are mixed with 600 g of KiON ML 33 in a 4 l flask. 6 ml of a 1M TBAF solution diluted with 114 ml of THF is added in the course of 30 min and then left to stir overnight. Filtration and distillative removal of the solvent leaves an insoluble and unmeltable solid.

Comparative Example 2

A nitrogen-inertized 1L single-neck flask equipped with magnetic core and condenser is initially charged at RT with 200 g of THF, 100 g of KiON HTT 1800 and 100 g of KiON ML 33. The homogeneous mixture is admixed with a solution comprising 1500 mg of TBAF in 38.2 ml of THF in the course of 45 min. After 30 min of subsequent stirring, it is possible to make out formation of a white solid, the mass of which increases rapidly. The solid is insoluble and unmeltable.

Comparative Example 3

200 g of KiON ML 33 are initially charged to a 500 ml 3 three-neck flask and admixed with 5 ml of a 1M TBAF/THF solution under vigorous agitation. A white solid is formed at the drop entry point. Completion of the admixture is followed by 60 min of stirring to obtain two-phase flask contents. The removed solid is insoluble and does not melt.

What is claimed is:

1. A method for producing high molecular weight solid, meltable thermoplastic pre-ceramic polymers, having a molecular weight of at least 2000 g/mol to 2 million g/mol, comprising the step of reacting one or more liquid low molecular weight polysilazanes, having a number-average molecular weight of 150 to 150 000 g/mol, in a solvent, in the presence of a catalyst by stopping the reaction with a stopping reagent as soon as the desired degree of polymerization is attained, wherein chlorides, bromides, iodides, fluorides and hydroxides of tetraalkyl-substituted ammonium salts are used as the catalyst.

2. The method as claimed in claim 1, wherein the one or more polysilazanes are of the general formula (1)

where R', R" and R''' are the same or different and each independently are hydrogen or an optionally substituted alkyl, aryl, vinyl or (trialkoxysilyl)alkyl radical, where n is an integer such that the polysilazane has a number-average molecular weight of 150 to 150 000 g/mol.

3. The method as claimed in claim 2, wherein R', R" and R''' each independently is a radical selected from the group consisting of hydrogen, methyl, ethyl, propyl, isopropyl, butyl, isobutyl, tert-butyl, phenyl, tolyl, vinyl, 3-(triethoxysilyl)propyl and 3-(trimethoxysilylpropyl).

4. The method as claimed in claim 1, wherein the one or more polysilazanes are perhydropolysilazanes of formula (2)

where n is an integer such that the polysilazane has a number-average molecular weight of 150 to 150 000 g/mol.

5. The method as claimed in claim 1, wherein the concentration of the catalyst in the reaction mixture is in the range from 0.01 wt % and 10 wt %.

6. The method as claimed in claim 1, wherein the solvent comprises organic solvents containing no water and also no reactive groups.

7. The method as claimed in claim 1, wherein the concentration of the starting materials in the reaction medium is in the range of 20-80 wt %.

8. The method as claimed in claim 1, wherein the solvent comprises aliphatic or aromatic hydrocarbons.

9. A method for producing high molecular weight solid, meltable thermoplastic pre-ceramic polymers, having a molecular weight of at least 2000 g/mol to 2 million g/mol, comprising the step of reacting one or more liquid low molecular weight polysilazanes, having a number-average molecular weight of 150 to 150 000 g/mol, in a solvent, in the presence of a catalyst by stopping the reaction with a stopping reagent as soon as the desired degree of polymerization is attained, wherein hydrides of alkali and alkaline earth metals are used as the stopping reagent.

* * * * *